(12) United States Patent
Sbarro

(10) Patent No.: US 7,690,972 B2
(45) Date of Patent: Apr. 6, 2010

(54) METHOD FOR MAKING A STEAMSHIP OF PORK CUT AND THE RESULTANT PRODUCT

(75) Inventor: James C. Sbarro, Parkville, MO (US)

(73) Assignee: Farmland Foods, Inc., Kansas City, MO (US)

( * ) Notice: Subject to any disclaimer, the term of this patent is extended or adjusted under 35 U.S.C. 154(b) by 734 days.

(21) Appl. No.: 11/548,993

(22) Filed: Oct. 12, 2006

(65) Prior Publication Data
US 2008/0090507 A1 Apr. 17, 2008

(51) Int. Cl.
*A22C 18/00* (2006.01)
(52) U.S. Cl. ...................................... 452/149
(58) Field of Classification Search ................ 452/149, 452/153–155, 170, 174, 198
See application file for complete search history.

(56) References Cited

U.S. PATENT DOCUMENTS

| | | | | |
|---|---|---|---|---|
| 1,719,408 | A * | 7/1929 | Waters | 452/135 |
| 3,594,189 | A * | 7/1971 | Panattoni | 426/104 |
| 5,951,392 | A * | 9/1999 | Gagliardi | 452/125 |
| 6,527,636 | B2 * | 3/2003 | Mickelsen | 452/149 |
| 6,939,217 | B2 * | 9/2005 | Gagliardi, Jr. | 452/149 |

* cited by examiner

*Primary Examiner*—Thomas Price
(74) *Attorney, Agent, or Firm*—Shook, Hardy & Bacon LLP

(57) ABSTRACT

The present invention is a method for cutting a pork leg to create a meat cut which includes an exposed bone feature and a squared face. The method for making the exposed bone feature involves trimming shank meat bare from a fibula bone and removing a tibia bone above a knee cap joint leaving a stifle joint intact. The method for making the squared face involves removing light and dark butt trim and a rump point to form a generally flat surface. When oriented downward, the flat surface aligns with any flat support surface and holds the meat cut in a standing position. The standing position directs the exposed bone feature generally upward in a unique and attractive presentation. Additionally, the present invention relates to the resultant product formed by the same method where the meat cut allows for improved roasting, braising, slow-cooking, and carving of a ham roast.

17 Claims, 9 Drawing Sheets

METHOD FOR MAKING A STEAMSHIP OF PORK CUT AND THE RESULTANT PRODUCT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This present invention relates to a method for making a Steamship leg of pork roast cut and the resultant product. In particular, the present invention relates to a method for cutting a pig carcass to produce a fresh ham and provides a method of trimming the leg of pork roast cut to produce a meaty and easy to carve Steamship leg of pork roast cut.

There exists in the art examples of methods for cutting pork leg portions from the carcass of the pig. Such examples disclose a method whereby the pork leg, or fresh ham is separated from the pork side by a straight cut approximately perpendicular to a line parallel to the shank bones. This straight cut passes near an anterior edge of an aitch bone. Next, a foot is removed slightly above the hock joint and the tail, vertebrae, flank muscle, and any other exposed lymph glands are removed. This example fresh ham is finished upon removal of overlying skin such that the skin and collar fat over a cushion is smooth and well rounded. Additional prior art provide examples provide a method for cutting a pork leg into a short shank variation of the first example. The initial steps are similar between the two; however, the shank is excluded by a straight cut made at an approximate right angle to the shank bones, thereby exposing a cross-section of the heel.

In butchering meats, the fresh ham contains trim meat and shank meat covering the shank bones. However, the present invention discloses a method for trimming shank meat from the fibula shank bone, removing the tibia shank bone, and removing the light and dark butt trim and rump point to form a squared face on the fresh ham.

In recent years, convenience and quality of presentation have become increasingly important to both consumers and food service distributors. Accordingly, the present invention is directed to the preparation and service of an innovative meat product, one which provides an aesthetic and easy-to-handle meat product. Such a product is quite suitable for home preparation and consumption. While particularly suited for sales in retail food markets, butcher shops, and grocers, the inventive meat product may also be sold to restaurants for commercial preparation and sale.

As such, the present invention will produce a unique and attractive meat cut that facilitates roasting, braising, or slow-cooking, as well as extending shelf-life. Further, the present invention improves cooked appearance and produces a tender bite and juicy flavor.

BRIEF SUMMARY OF THE INVENTION

Accordingly, the present invention provides a method for making a Steamship Leg of Pork roast cut and the resultant product. The first step involves separating a fresh ham from a pig carcass. This step involves making a cut perpendicular to an aitch bone that separates a leg from a loin, and making a second cut at a hock joint separating a foot from the leg. The remaining portion is a fresh ham, which includes a portion of the aitch bone, a leg bone referred to as the femur, a knee cap or patella, a stifle joint, several tail vertebrae, and a pair of shank bones. The pair of shank bones include a tibia bone and a fibula bone. The fresh ham portion also includes a layer of skin and fat, a rump (butt) end, cushion muscles, and a shank meat. The rump end includes, among other meat sections, a rump point, and a light and dark butt trim.

Once the fresh ham is separated from the pig carcass, the next step is to form the Steamship leg of pork roast from the fresh ham. First, the layer of skin is initially removed from the pork ham to create a smooth outer surface. Next, a cutting tool is used to trim the shank meat away from the pair of hind shank bones. The shank meat is trimmed bare to the fibula bone while the smaller shank bone, the tibia bone, is removed above the knee cap. During this step, the stifle joint is left intact and no extra cuts to the shank meat are performed. The light and dark butt trim and the rump point are removed to form a squared face on the fresh ham. The squared face is generally a flat surface that allows the fresh ham to rest in a standing position when the flat surface is orientated downward toward another flat surface such as a table, meat counter, or shelf. In the standing position, the fibula bone is directed substantially upwards creating a unique and aesthetic appearance. Another beneficial characteristic of the standing position is that it provides for improved carving and cooking of the ham.

Additional advantages, and novel features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

In the accompanying drawings which form a part of the specification and which are to be read in conjunction therewith, and in which like reference numerals are used to indicate like parts in the various views.

DETAILED DESCRIPTION OF THE INVENTION

The present invention is directed to a method for cutting a leg of pork, fresh ham, from a pig carcass and cutting the fresh ham to create a Steamship leg of pork roast.

Figure 1:
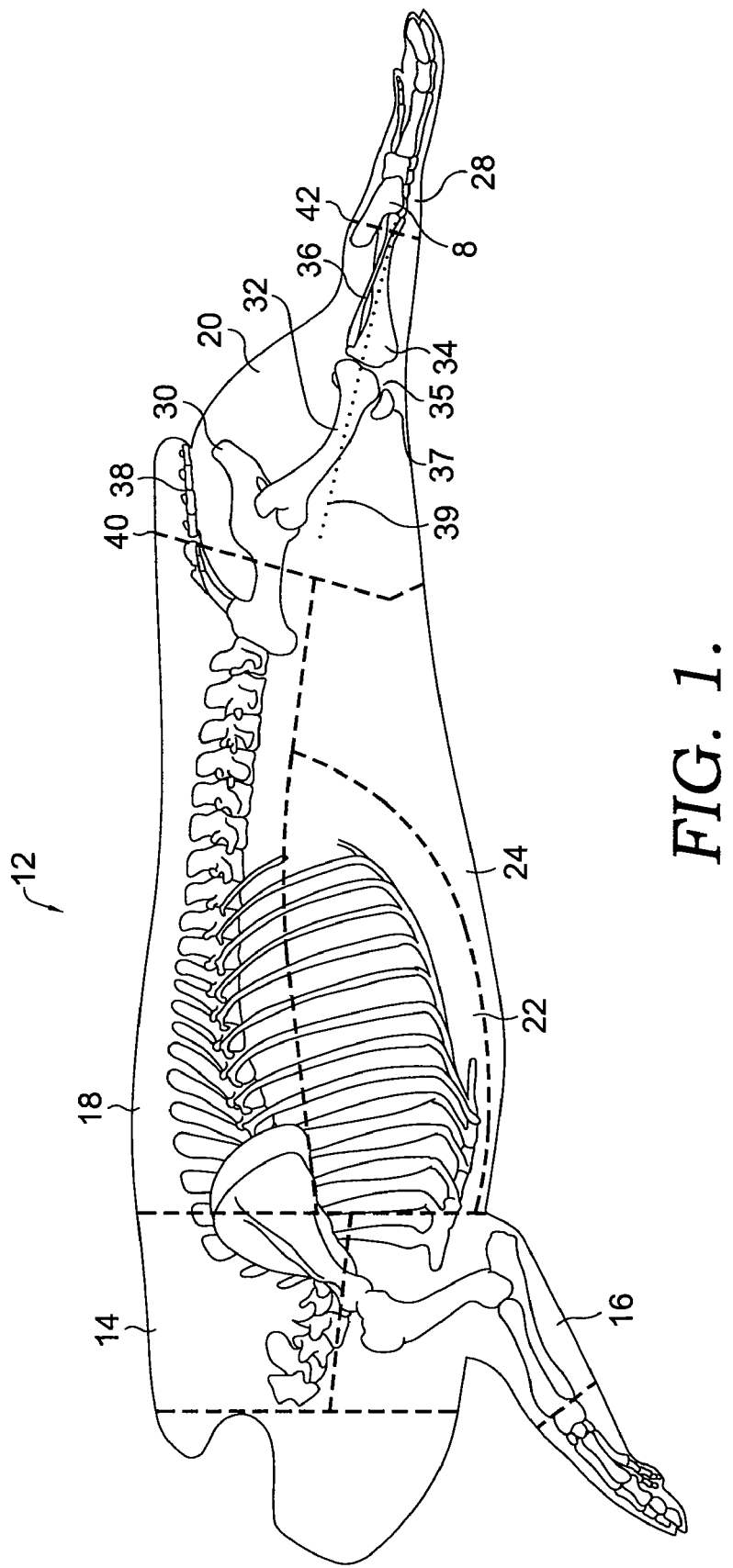
FIG. 1 is a lateral skeletal view of a pig carcass showing the pork ham or hind leg and shows the ham loin separation.
Figure 2:
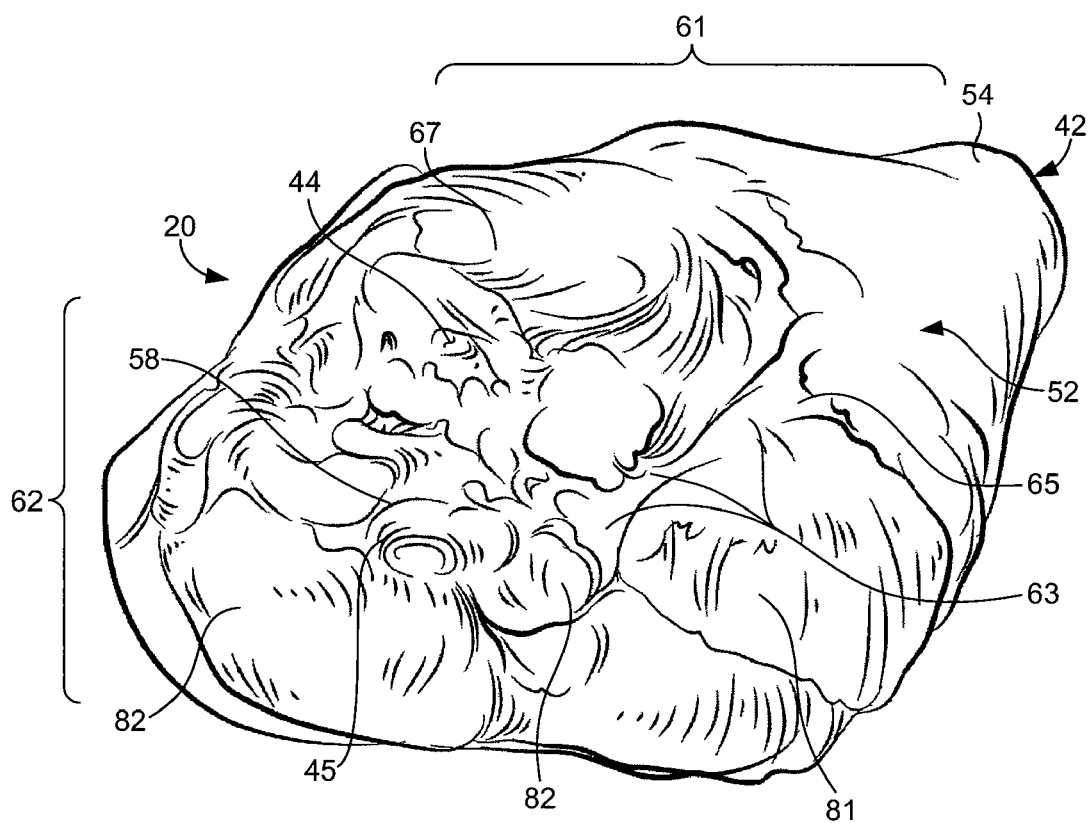
FIG. 2 is a perspective view of the fresh pork ham starting point.

Referring to the drawings in greater detail and initially to FIGS. 1-9, a method for making the Steamship leg of pork roast 10 (FIG. 9) is described. FIG. 1 shows a skeletal view of a pig carcass 12 that is sectioned by dashed lines representing incisions, e.g. cuts 40 and 42, which separate the pig carcass 12 into primary sections of meat. An exemplary embodiment of a pig carcass 12 is a chilled fresh pig carcass produced similar to North American Meat Processors Association (NAMP) 403B. The primary sections of meat that are carved from the pig carcass 12 are a Boston butt 14, a picnic 16, a loin 18, spareribs 22, a side 24, a fresh ham 20, and a foot 28. The present invention relates to the fresh ham 20 section, which includes a portion of an aitch bone 30, a leg bone 32, a knee cap (patella) 37, a stifle joint 35, several tail vertebrae 38, and a pair of shank bones. The pair of shank bones include a tibia bone 36 and a fibula bone 34. Additionally, as shown in FIG. 2, the fresh ham 20 includes a layer of skin and fat 61, several lymph glands 63, a rump (butt) end 62, cushion muscles 65, a flank muscle 67, and a shank meat 54. The rump end 62 includes, among other meat sections, a rump point 82, and a light and dark butt trim meat 81.

The method of separating the fresh ham 20 from the pig carcass 12 will now be discussed. The fresh ham 20 is initially separated from the side 24, and loin 18 by incising with a cutting utensil similar to cutting tool 50 (FIG. 3) along a ham-loin separation cut 40 as referenced in FIG. 1. It should be understood that other suitable cutting utensils could be used, such as a hand saw, serrated knife, or band saw. The ham-loin separation cut 40 is a straight cut approximately perpendicular to a projected line 39, which runs parallel to the shank bones, 34, 36. The ham-loin separation cut 40 completely separates the fresh ham 20 from the rest of the pig carcass 12. The ham-loin separation cut 40 passes near an anterior edge of the aitch bone 30. Next, the aitch bone 30 is completely removed from the fresh ham 20. A resulting cavity 44 in the fresh ham 20 is depicted in FIG. 2. A preferred method for removing the aitch bone 30 is such that the cutting tool 50 does not slash any of the cushion muscles 65. After removing the aitch bone 30, hard gristle 58 adjacent to silver dollar 45 is removed from the fresh ham 20.

Next, the foot 28 is completely removed from the pig carcass 12. This separation is performed along a ham-foot separation cut 42, which is made by slicing with a cutting tool 50 (FIG. 3) along a section slightly above the hock joint 8. It is preferred that a minimum number of cuts are used while making separation cuts 40, 42, and that no resultant knife cuts penetrate into the cushion muscles 65.

Upon separating the fresh ham 20 from the loin 18, the side 24, and the foot 28; the next formation step is to remove the several tail vertebrae 38, the flank muscle 67, and the exposed lymph glands 63. Further, the loose surrounding tissue, loose hanging fat, exposed blood vessels, and associated non-lean tissue (not shown), are also removed at this time via the cutting tool 50 as part of facing process. It should be understood that the loose surrounding tissue, loose hanging fat, exposed blood vessels, and associated non-lean tissue are not shown in FIGS. 2-9 because they have been previously removed. An exemplary embodiment of the fresh ham is a seventeen to twenty pound, bone-in ham, i.e. NAMP 401 Fresh Ham; however, this is not meant to be limiting.

Upon separation of the fresh ham 20 from the pig carcass 12, the formation of the Steamship leg of pork roast 10 (FIG. 9) may commence. Returning to FIG. 2, an exterior of the fresh ham 20 as illustrated in this stage of processing still retains a portion of overlying skin 52, which is part of the layer of skin and fat 61. The fresh ham 20 is finished upon removal of overlying skin 52 such that a surface of skin and collar fat 64 (FIG. 6) over the cushion muscle 65 is smooth and well rounded.

Figure 3:
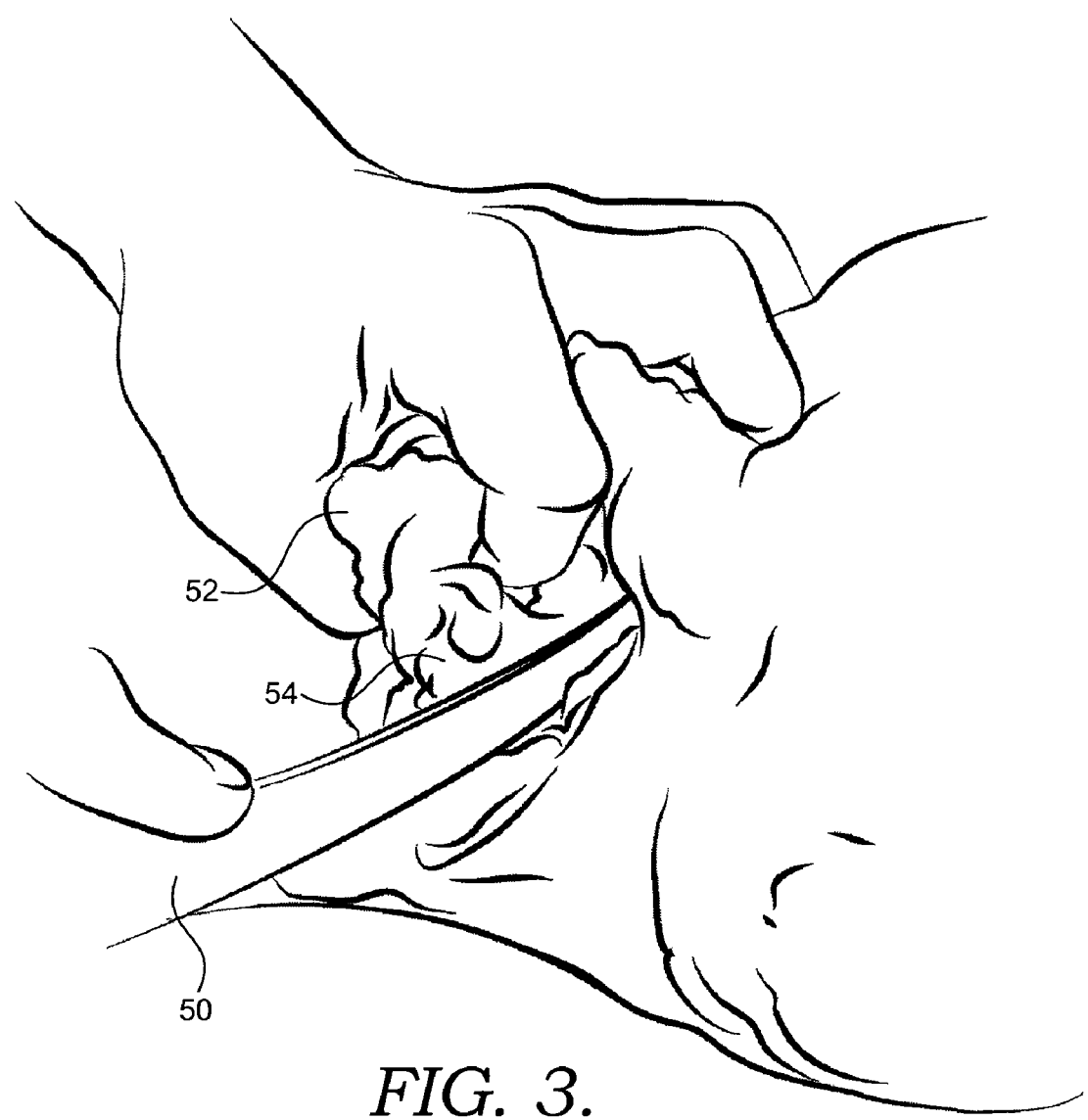
FIG. 3 is a perspective view of the shank meat being trimmed.

FIG. 3 shows one illustrative embodiment for butchering the fresh ham 20. Any arrangement for supporting the fresh ham 20 will suffice for practicing the present invention so long as all portions of the fresh ham 20 are suitably accessible for processing. In the illustrated example, the fresh ham 20 is supported by a cutting surface 85 (FIG. 6) thereby freeing both the butcher's hands for use in the process.

Returning to FIG. 3, a section of shank meat 54 is completely removed by operation of a cutting tool 50. The shank meat 54 should be trimmed down to the larger shank bone, the fibula bone 34. The preferred process requires that the shank meat 54 is completely removed from both sides of the tibia bone 36 and fibula bone 34.

Figure 7:
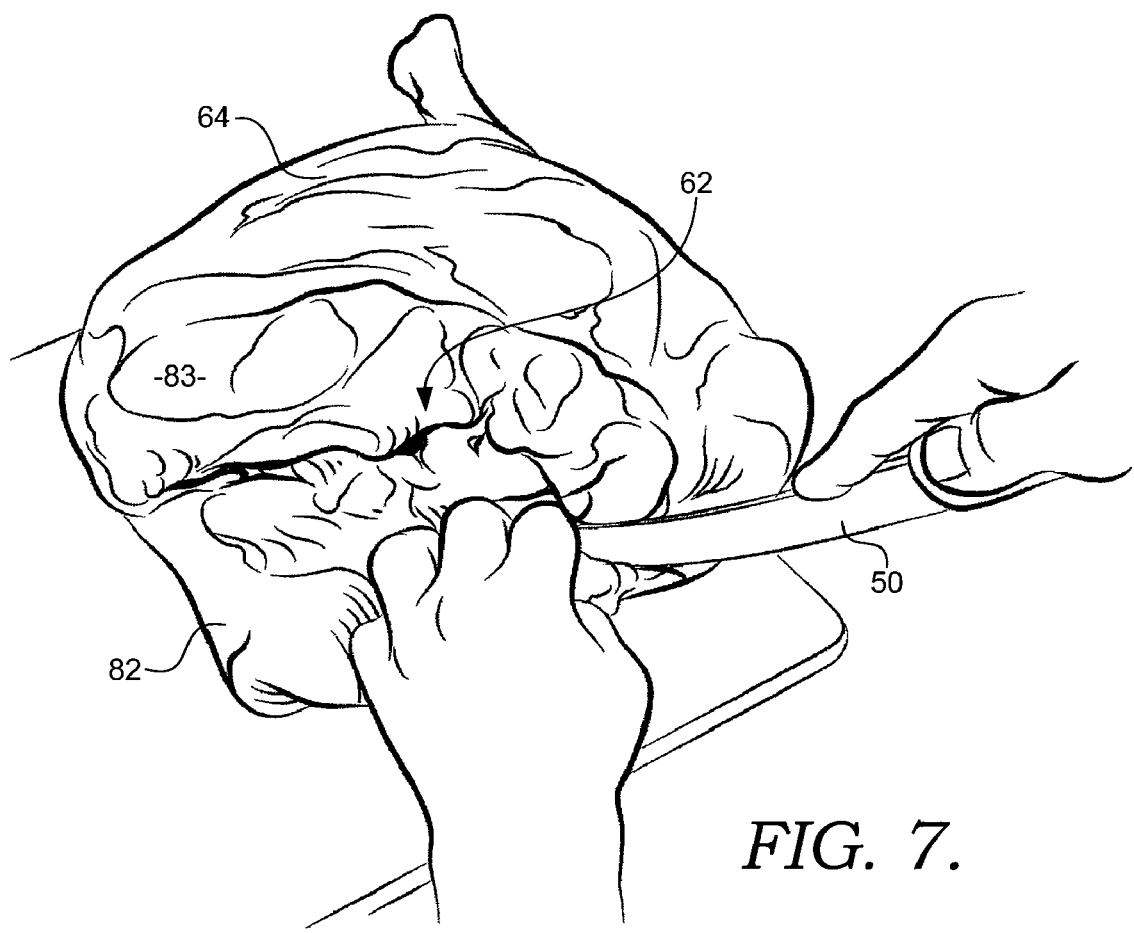
FIGS. 7 and 8 are perspective views of the light and dark muscle trim removed.

Next, the fat from the layer of skin and fat 61 is trimmed to form a fat cover 64. The fat cover 64 mainly includes skin and collar fat. The fat cover 64 is trimmed to a preferred depth of 0.25 inches and not to exceed 0.4 inches. However, this dimension is not meant to be limiting. As shown in FIG. 7, the fat cover 64 represents the outside surface, but for the cut surfaces, of the fresh ham 20.

Figure 4:
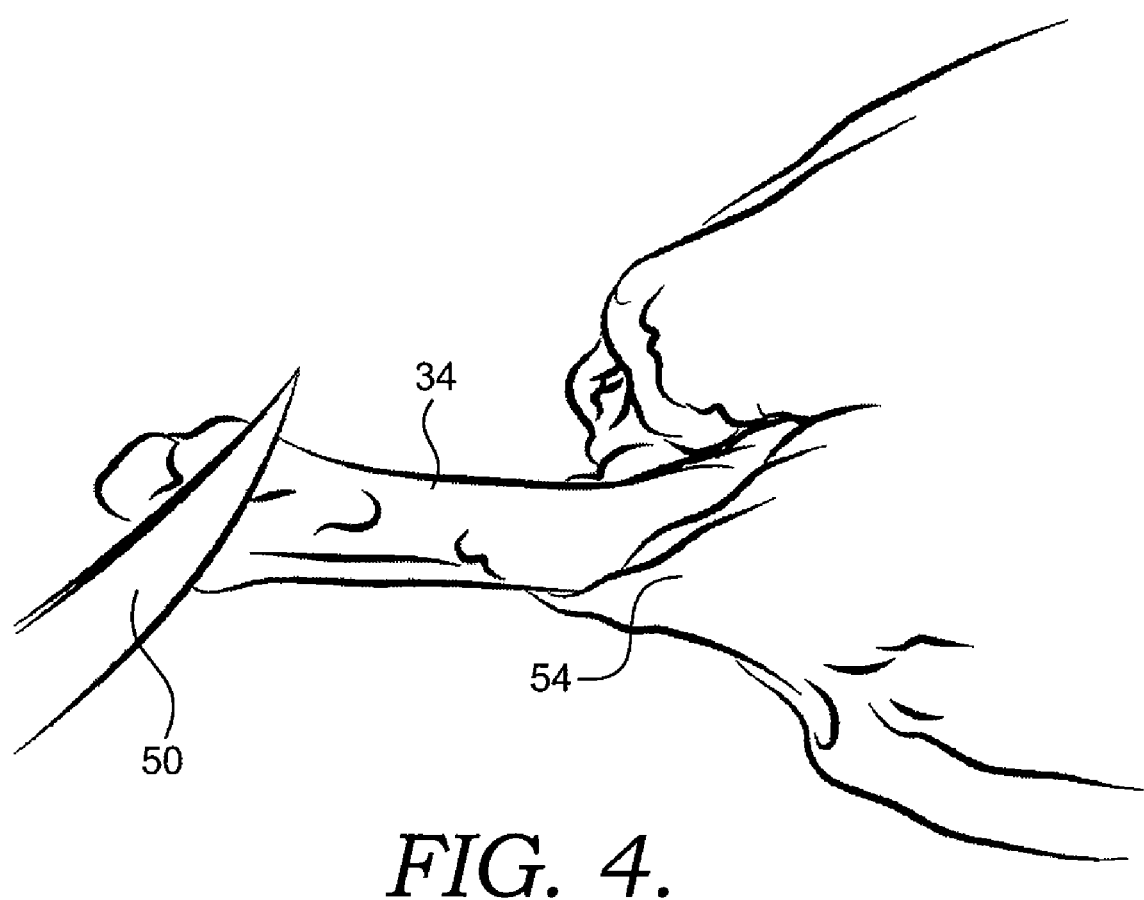
FIG. 4 is a perspective view similar to FIG. 3, but where the fibula bone is exposed.

FIG. 4 best illustrates the shank meat 54 trimmed bare to the fibula bone 34. After trimming the shank meat 54 away from the fibula bone 34, the cutting tool 50 is used to remove the tibia bone 36 down to the knee cap 37. In other words, the tibia bone 36 is completely removed. During this step in the formation procedure, the stifle joint 35 should be left entirely intact. A preferred process for removing the tibia bone 36 allows for no additional incisions or damage to the shank meat 54.

Figure 5:
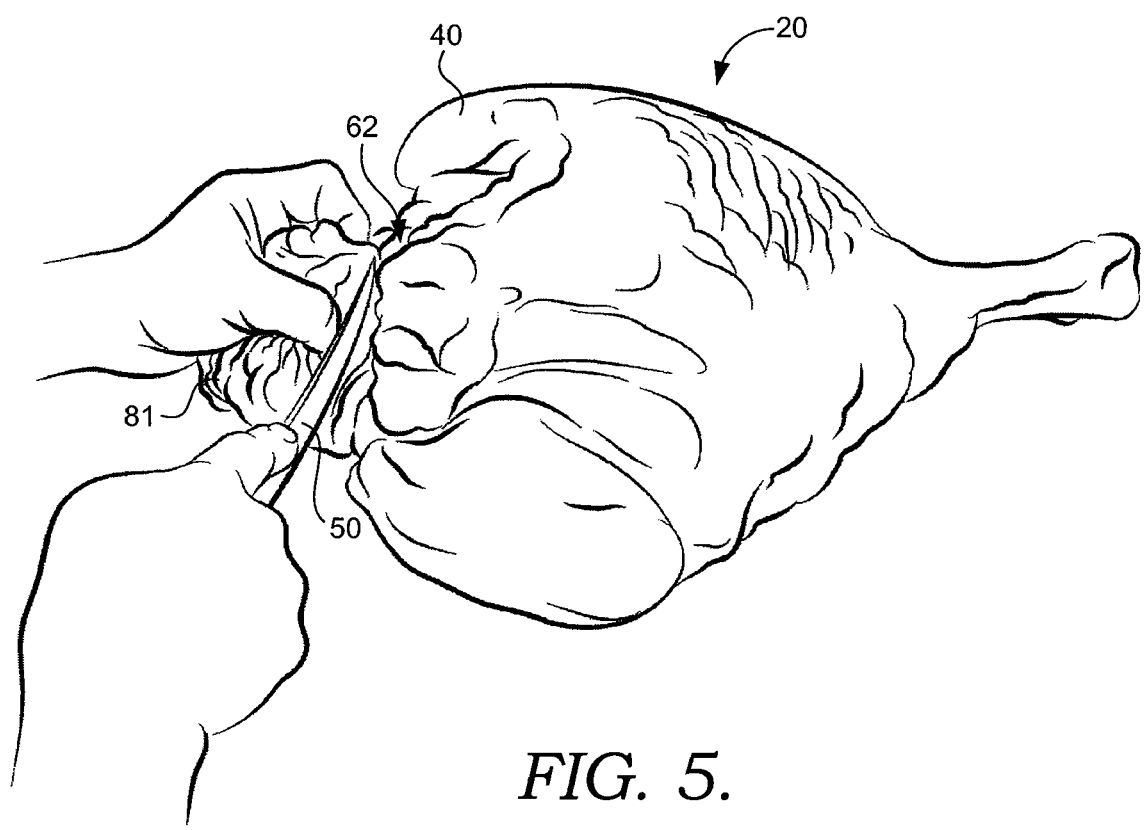
FIG. 5 is a perspective view of the light and dark muscle trim being removed.
Figure 6:
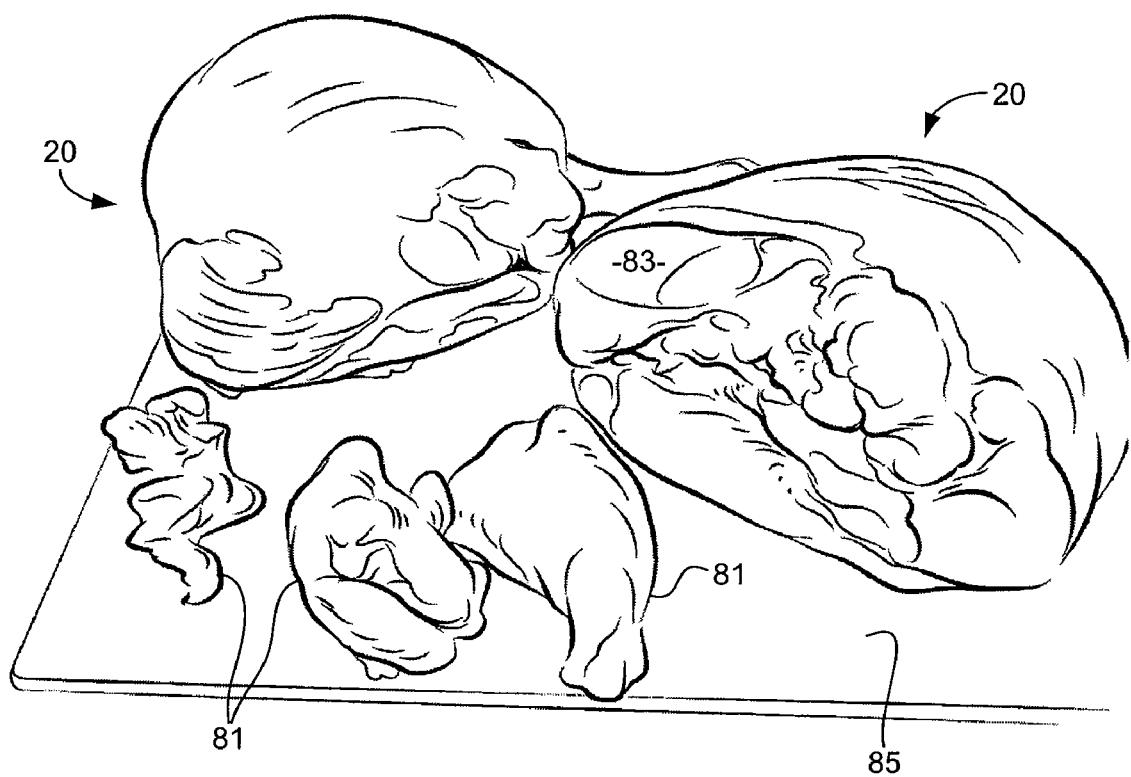
FIG. 6 is a perspective view of the rump point being removed.

As shown in FIG. 5, the next procedure in forming the Steamship leg of pork roast 10 consists of removing the light and dark butt trim meat 81 from the rump end 62. The light and dark butt trim meat 81 is removed such that the ham-loin separation cut 40 face of the rump end 62 forms a squared face 83 on the fresh ham 20. The preferred embodiment of the squared face 83 is a generally flat surface. As depicted in FIG. 6, the light and dark butt trim meat 81 sections are completely removed and displayed on the cutting surface 85.

Figure 8:
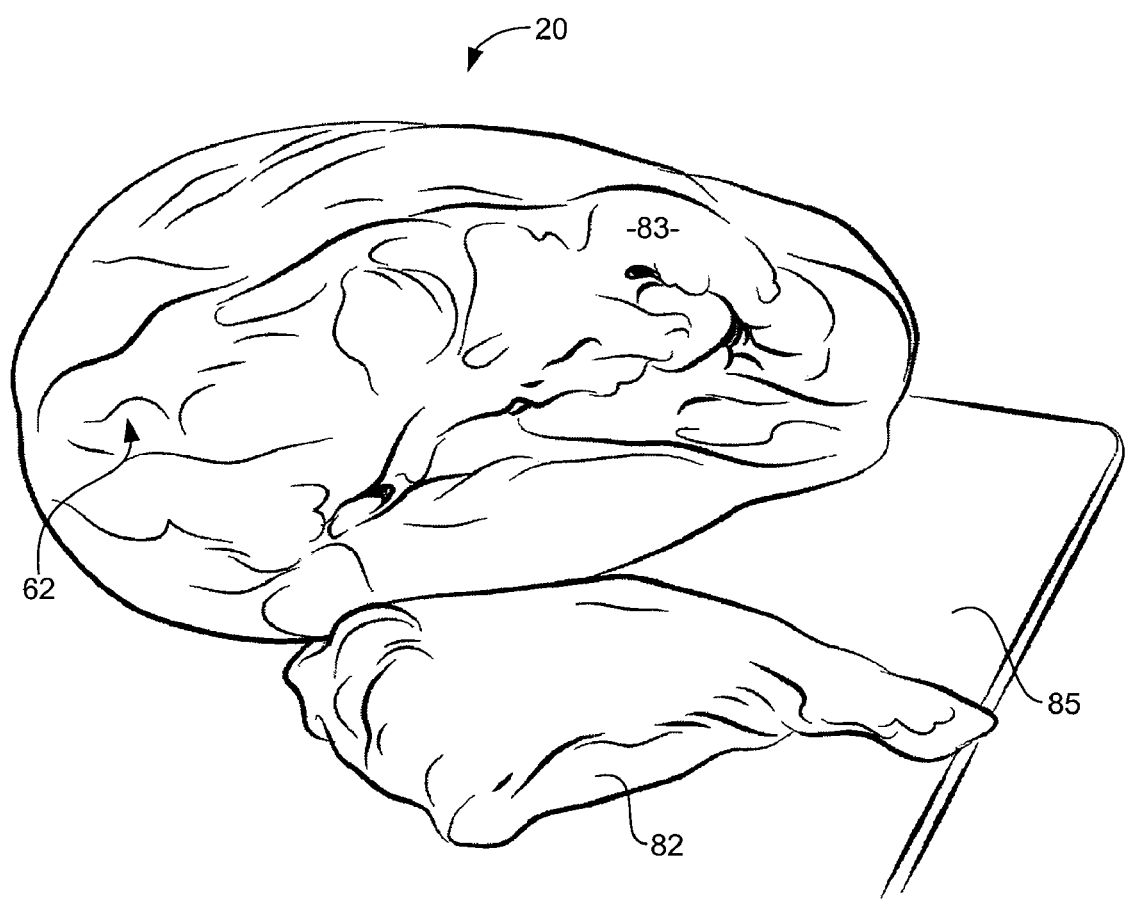

In the next step, as shown in FIG. 7, the cutting tool 50 is used to remove a portion of the rump point 82 from the rump end 62. The remainder of the rump point 82, which is attached to the fresh ham 20, and the rump end 62 are trimmed square to further develop the flat surface of the square face 83. The square face 83 and the removed section of the rump point 82 are shown in FIG. 8. The squared face 83 is completed at this stage in the formation process. Moreover, all cutting performed on the fresh ham 20 for the resultant Steamship leg of pork roast 10 is complete.

Figure 9:
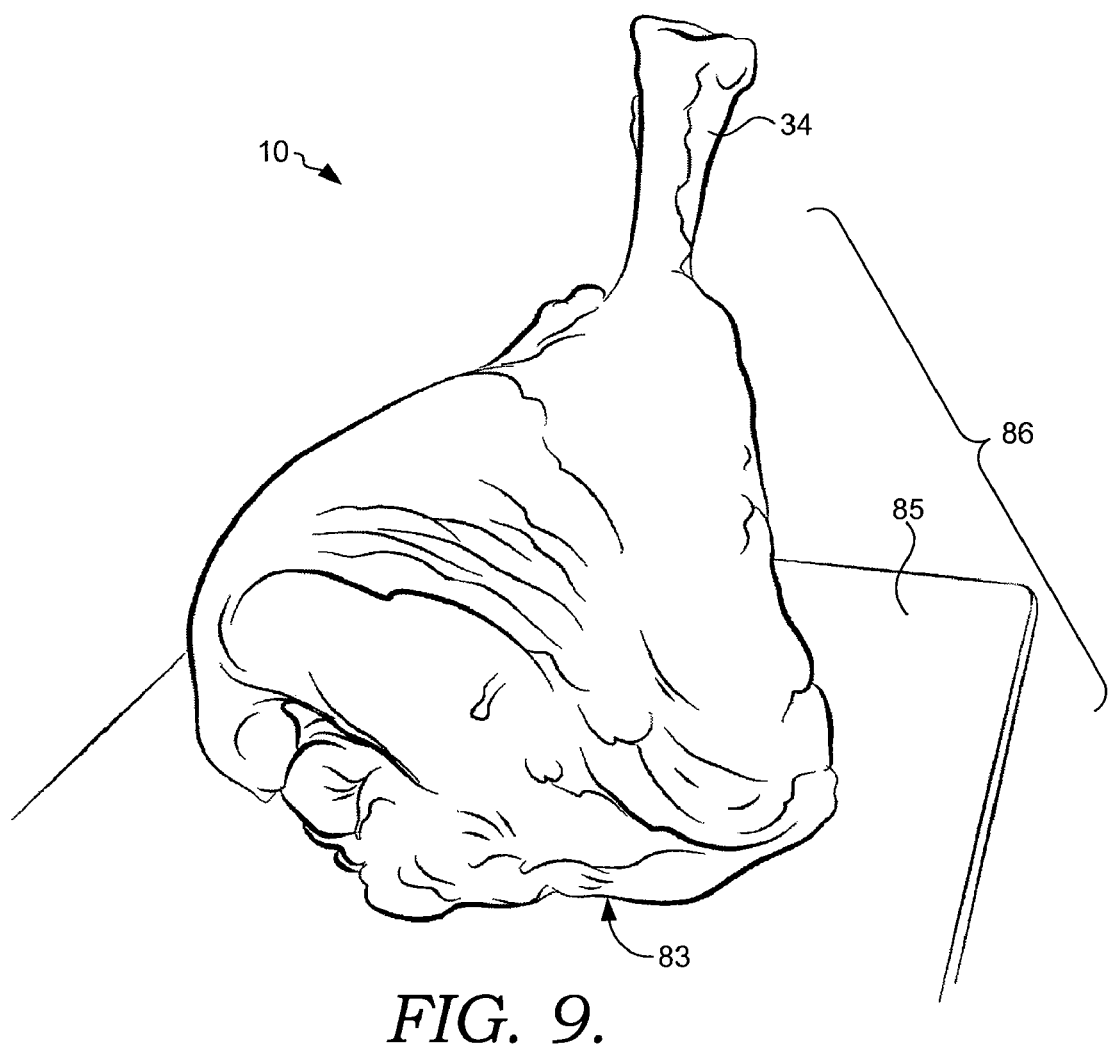
FIG. 9 is a perspective view of the finished Steamship leg of pork cut in standing position.

The Steamship leg of pork roast 10, as shown in FIG. 9, is able to stand upright on a flat surface, e.g. the cutting surface 85, by placing the squared face 83 downward toward the flat surface. This orientation displays the Steamship leg of pork roast 10 in a standing position 86. The standing position 86 directs the fibula bone 34 in a generally upward direction. A functional benefit of the standing position 86 is that the squared face 83 allows for improved stability and ease of handling. More specifically, the standing position 86 provides for the fixed and stable orientation of the Steamship leg of pork roast 10 on flat surfaces and sets a standard orientation of the Steamship leg of pork roast 10 that ensures a producer's affixed label will be orientated properly when on display. Additionally, the standing position 86 resolves the issue of whether a meat's unpredictable resting position on a flat surface will display a manufacturer's label improperly. Further, the standing position 86 provides a unique and attractive meat cut that facilitates roasting, braising, or slow-cooking, as well as extending the shelf-life. Moreover, the standing position 86 improves cooked appearance, facilitates carving the Steamship leg of pork roast 10, and produces a tender bite and juicy flavor.

The present invention has been described in relation to particular embodiments, which are intended in all respects to be illustrative rather than restrictive; changes may be made in form and detail. Alternative embodiments will become apparent to those skilled in the art to which the present invention pertains without departing from its scope. For example, the description and figures refer specifically to a method for preparing a Steamship leg of pork roast from a fresh ham. However, the method of the present invention could be applied to all classes of swine beyond the domesticated pig, encompassing all wild relatives, e.g. boar. Further, the process can be performed an any alternative manner where the order of the formation procedure is modified, where the specific steps are combined, reversed, or eliminated.

It will be seen from the foregoing that this invention is one well adapted to attain the ends and objects set forth above, and to attain other advantages, which are obvious and inherent in the device. It will be understood that certain features and subcombinations are of utility and may be employed without reference to other features and subcombinations. This is contemplated. It will be appreciated by persons skilled in the art that the present invention is not limited to what has been particularly shown and described hereinabove. Rather, all matter herein set forth or shown in the accompanying drawings is to be interpreted as illustrative and not limiting.

The invention claimed is:

1. A method for forming a meat cut from a fresh ham, the fresh ham having a shank meat, a fibula bone, a tibia bone, an aitch bone, a rump end, and a stifle joint, the rump end having a butt trim, and a rump point, said method comprising:
   trimming the shank meat from the fibula bone;
   removing the tibia bone; and
   removing the butt trim to form a face on the meat cut.

2. The meat cut as recited in claim 1, wherein the face is generally squared.

3. The meat cut as recited in claim 1, wherein the rump point is trimmed when forming the face.

4. The meat cut as recited in claim 1, wherein the meat cut is a ham roast.

5. The meat cut as recited in claim 1, wherein the butt trim is light and dark butt trim.

6. The meat cut as recited in claim 1, wherein the squared face is generally planar and aligns with a support surface whereby creating an upper portion and lower portion of the meat cut.

7. The meat cut as recited in claim 5, wherein the meat cut rests for carving on the squared face such that the fibula bone is located on the upper portion of the meat cut.

8. The meat cut as recited in claim 1, wherein the shank meat is trimmed down to the fibula bone.

9. The meat cut as recited in claim 1, wherein the tibia bone is removed above a knee cap joint leaving the stifle joint intact.

10. The meat cut as recited in claim 1, wherein the meat cut is taken from a swine carcass by making a straight cut generally perpendicular to a line parallel to the shank bones.

11. The meat cut as recited in claim 1, wherein excess skin, fat, and tissue covering the meat cut is removed, creating a smooth surface.

12. A method for forming a meat cut from a pig carcass, the pig carcass including a loin, a side, a foot, and a fresh ham, the fresh ham including a shank meat, a fibula bone, a tibia bone, an aitch bone, a rump end, and a stifle joint, the rump end including a light and dark butt trim, and a rump point, said method comprising:
   separating with a cutting tool the fresh ham from the loin and side at the aitch bone;
   separating with a cutting tool the foot from the fresh ham;
   trimming the shank meat from the fibula bone;
   removing the tibia bone while leaving the stifle joint intact; and
   removing the light and dark butt trim to and the rump point to form a face on the meat cut.

13. The meat cut as recited in claim 12, wherein the face is generally squared.

14. The meat cut as recited in claim 13, wherein the meat cut is a ham roast.

15. The meat cut as recited in claim 14, wherein the tibia bone is removed above a knee cap joint.

16. The meat cut as recited in claim 15, wherein the squared face is generally planar and aligns with a support surface whereby creating an upper portion and lower portion of the meat cut.

17. The meat cut as recited in claim 16, wherein the meat cut rests for carving on the squared face such that the fibula bone is located on the upper portion of the meat cut.

* * * * *